(12) United States Patent
Kano et al.

(10) Patent No.: US 10,227,085 B2
(45) Date of Patent: Mar. 12, 2019

(54) ROTARY ELECTRIC MACHINE CONTROL APPARATUS AND ELECTRIC POWER STEERING APPARATUS USING THE SAME

(71) Applicant: DENSO CORPORATION, Kariya, Aichi-pref. (JP)

(72) Inventors: Ryo Kano, Kariya (JP); Takashi Suzuki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 19 days.

(21) Appl. No.: 15/670,992

(22) Filed: Aug. 7, 2017

(65) Prior Publication Data

US 2018/0037253 A1    Feb. 8, 2018

(30) Foreign Application Priority Data

Aug. 8, 2016   (JP) .................................. 2016-155328

(51) Int. Cl.
    *B62D 5/04*      (2006.01)
    *H02K 11/25*      (2016.01)
    *H02K 11/33*      (2016.01)
    *H02P 29/64*      (2016.01)

(52) U.S. Cl.
CPC .......... *B62D 5/0412* (2013.01); *B62D 5/0463* (2013.01); *H02K 11/25* (2016.01); *H02K 11/33* (2016.01); *H02P 29/64* (2016.02)

(58) Field of Classification Search
CPC .................................................... B62D 5/0412
USPC ............................ 318/641, 400.21, 788, 434
See application file for complete search history.

(56) References Cited

U.S. PATENT DOCUMENTS

| | | | |
|---|---|---|---|
| 10,029,727 B2* | 7/2018 | Nakamura | B62D 5/0496 |
| 2009/0052210 A1* | 2/2009 | Ward | G05D 23/20 |
| | | | 363/56.01 |
| 2015/0084570 A1* | 3/2015 | Hara | B62D 5/0403 |
| | | | 318/494 |
| 2016/0036304 A1 | 2/2016 | Yamasaki et al. | |
| 2016/0126877 A1 | 5/2016 | Endo | |
| 2017/0359008 A1* | 12/2017 | Kano | H02P 6/28 |

FOREIGN PATENT DOCUMENTS

| | | |
|---|---|---|
| JP | 2013-005669 | 1/2013 |
| JP | 2016-036246 a | 3/2016 |
| JP | 2016-092944 A | 5/2016 |

\* cited by examiner

*Primary Examiner* — Jorge L Carrasquillo
(74) *Attorney, Agent, or Firm* — Knobbe, Martens, Olson & Bear, LLP

(57) ABSTRACT

A rotary electrical machine control apparatus is provided which controls drive of a rotary electrical machine having a plurality of winding sets. The apparatus includes inverters that are provided so as to respectively correspond to the winding sets, a temperature detection element that detects a base element that is used as a base for estimation of inverter temperatures, which are temperatures of the inverters, and a control section that has a temperature estimation section that estimates the inverter temperatures based on the base temperature and a temperature change amount generated due to current application to the inverters. On-resistance of the switching elements of the first inverter is smaller than on-resistance of the switching elements of the second inverter. The temperature detection element is disposed in an area, a distance between the area and the first inverter being shorter than a distance between the area and the second inverter.

7 Claims, 8 Drawing Sheets

ROTARY ELECTRIC MACHINE CONTROL APPARATUS AND ELECTRIC POWER STEERING APPARATUS USING THE SAME

CROSS-REFERENCE TO RELATED APPLICATION

This application is based on and claims the benefit of priority from earlier Japanese Patent Application No. 2016-155328 filed Aug. 8 2016, the description of which is incorporated herein by reference.

BACKGROUND

Technical Field

The present invention relates to a rotary electrical machine control apparatus and an electric power steering apparatus using the same.

Related Art

Conventionally, a motor control apparatus is known which estimates a temperature of a motor coil or an electronic component configuring a power inverter and limits, for example, a current command value, to prevent overheating. For example, in JP-A-2016-92944, a temperature change amount is added to a sensor value of a temperature sensor to calculate a temperature estimation value.

If a combination of a winding set and an inverter is defined as a system, JP-A-2016-92944 discloses temperature estimation in one system. JP-A-2016-92944 does not at all describe temperature estimation in a plurality of systems. In addition, JP-A-2016-92944 does not at all describe the placement of a temperature sensor when a plurality of systems are used.

SUMMARY

An embodiment provides a rotary electrical machine control apparatus that can properly estimate an inverter temperature, and an electric power steering apparatus using the same.

As an aspect of the embodiment, a rotary electrical machine control apparatus is provided which controls drive of a rotary electrical machine having a plurality of winding sets. The apparatus includes: a plurality of inverters that are provided so as to respectively correspond to the winding sets; a temperature detection element that detects a base element that is used as a base for estimation of inverter temperatures, which are temperatures of the inverters; and a control section that has a temperature estimation section that estimates the inverter temperatures based on the base temperature and a temperature change amount generated due to current application to the inverters. On-resistance of the switching elements of the first inverter, which is one of the plurality of inverters, is smaller than on-resistance of the switching elements of the second inverter, which is one of the plurality of inverters, and the temperature detection element is disposed in an area, a distance between the area and the first inverter being shorter than a distance between the area and the second inverter.

DETAILED DESCRIPTION OF THE PREFERRED EMBODIMENTS

Hereinafter, a rotary electrical machine control apparatus according to the present invention will be described with reference to the drawings.

Embodiment

FIGS. 1 to 8 are drawings concerning the embodiment.

Figure 1:
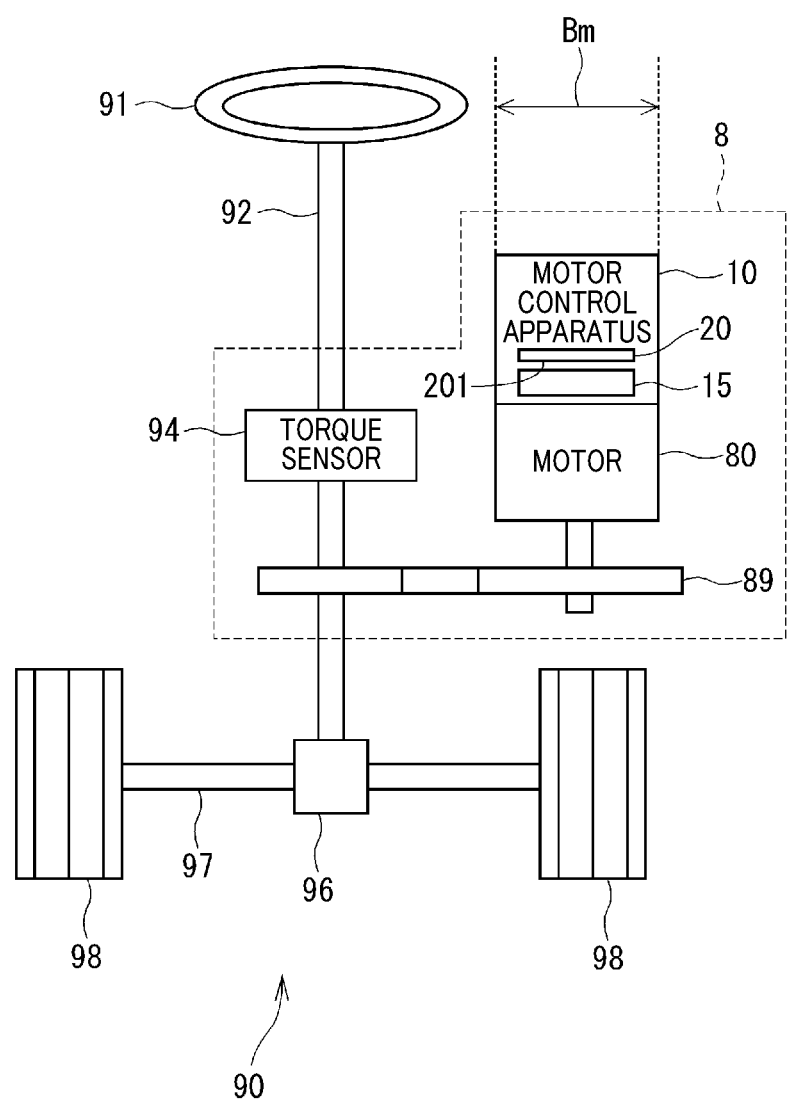
FIG. 1 is a diagram schematically showing the configuration of a steering system according to an embodiment.

As shown in FIG. 1, a motor control apparatus 10, which is a rotary electrical machine control apparatus, is applied to an electric power steering apparatus 8 that assists steering operation of the driver in cooperation with a motor 80, which is a rotary electrical machine.

FIG. 1 shows the configuration of a steering system 90 including the electric power steering apparatus 8. The steering system 90 has a steering wheel 91, which is a steering member, a steering shaft 92, a pinion gear 96, a rack shaft 97, wheels 98, and the electric power steering apparatus 8.

The steering wheel 91 is connected to the steering shaft 92. The steering shaft 92 is provided with a torque sensor 94 that detects steering torque applied by operation of the steering wheel 91 of the driver. An end of the steering shaft 92 is provided with the pinion gear 96. The pinion gear 96 engages with the rack shaft 97. A pair of wheels 98 is connected to both ends of the rack shaft 97 via a tie rod and the like.

When the driver rotates the steering wheel 91, the steering shaft 92 connected to the steering wheel 91 rotates. The rotational motion of the steering shaft 92 is converted to linear motion of the rack shaft 97 by the pinion gear 96. The pair of wheels 98 is steered at an angle depending on the amount of displacement of the rack shaft 97.

The electric power steering apparatus 8 includes the motor 80, a reducing gear 89, the motor control apparatus 10, and the like. The reducing gear 89 is a power transmission member that reduces rotational speed of the motor 80 and transmits the rotation to the steering shaft 92. Although the electric power steering apparatus 8 of the present embodiment is a so-called column assist type, the electric power steering apparatus 8 may be a so-called rack assist type that transmits the rotation of the motor 80 to the rack shaft 97. That is, in the present embodiment, although the steering shaft 92 corresponds to an object to be driven, the rack shaft 97 may be an object to be driven.

The motor 80 outputs auxiliary torque for assisting steering operation of the steering wheel 91 of the driver, and is driven by being supplied with electric power from a battery 5 (refer to FIG. 2), which is a power supply, to rotate the reducing gear 89 in the forward or reverse direction.

Figure 2:
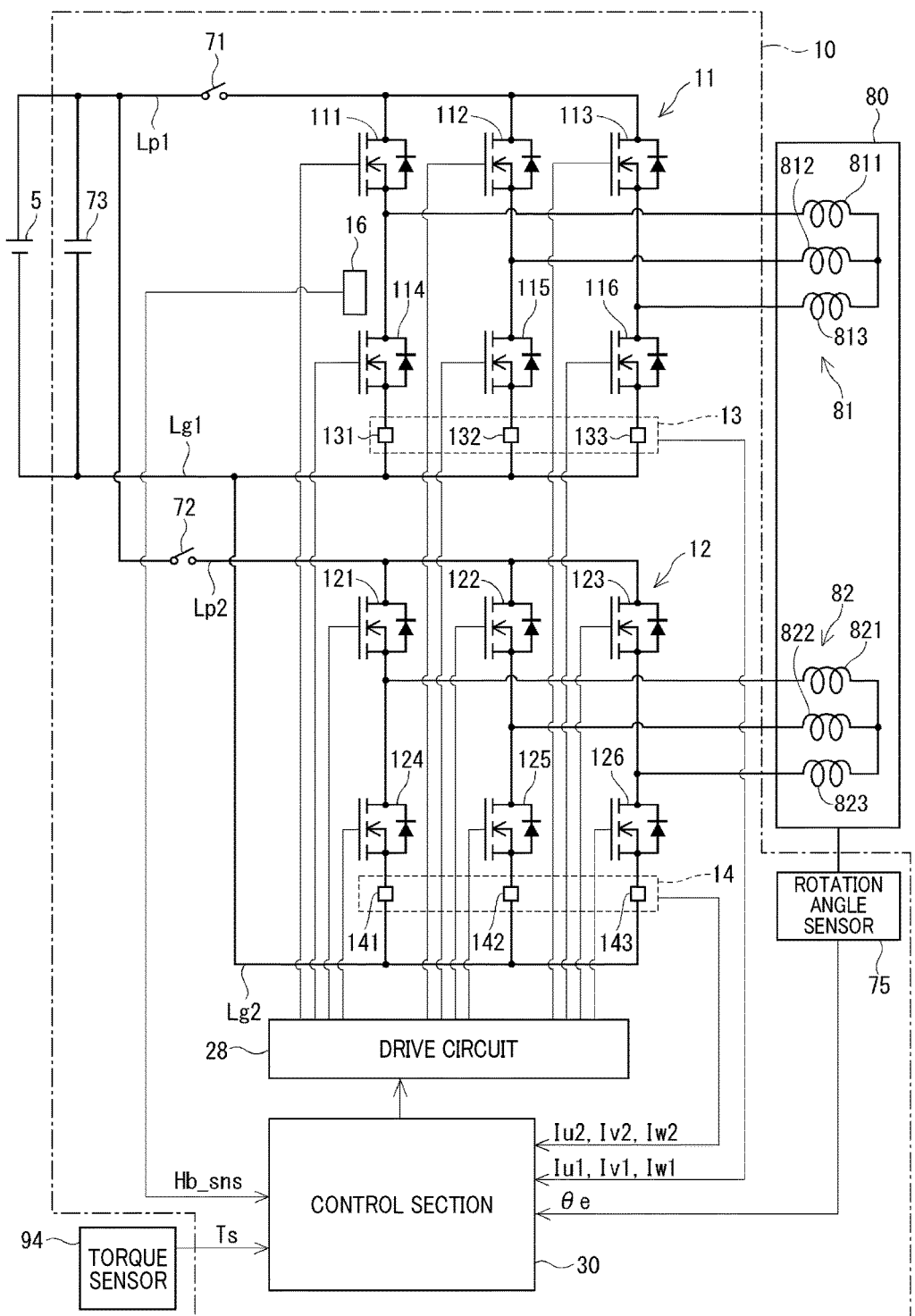
FIG. 2 is a circuit diagram of a motor control apparatus according to the embodiment.

As shown in FIG. 2, the motor 80 is a three-phase brushless motor and has two winding sets 81 and 82.

The first winding set 81 has a first U-phase coil 811, a first V-phase coil 812, and a first W-phase coil 83. One end of each of the coils 811, 812, and 813 is connected to a first inverter 11, and the other ends of the coils 811, 812, and 813 are connected to each other.

The second winding set 82 has a second U-phase coil 821, a second V-phase coil 822, and a second W-phase coil 823. One end of each of the coils 821, 822, and 823 is connected to a second inverter 12, and the other ends of the coils 821, 822, and 823 are connected to each other.

In the present embodiment, the first winding set 81 and the second winding set 82 are arranged so as to be displaced from each other by a predetermined electrical angle (e.g. 30°). Electric power in which phases are displaced from each other depending on the displacement of the electrical angle is supplied to the winding set 81 and 82.

The motor control apparatus 10 includes the first inverter 11, the second inverter 12, a thermistor 16, which is a temperature detection element, and a control section 30. The inverters 11 and 12, the thermistor 16, and the control section 30 are mounted on a substrate 20. The motor control apparatus 10 is provided at one side of the motor 80 in the axial direction thereof and within a projection area Bm obtained by projecting the motor 80 in the axial direction (refer to FIG. 1). In the present embodiment, the motor 80 and the motor control apparatus 10 are integrated so as to be a so-called mechanically and electrically integrated type.

The first inverter 11 is provided so as to correspond to the first winding set 81, and the second inverter 12 is provided so as to correspond to the second winding set 82. Hereinafter, a combination of the first winding set 81 and the first inverter 11 and the like provided so as to correspond to the first winding set 81 is defined as a first system. A combination of the second winding set 82 and the second inverter 12 and the like provided so as to correspond to the second winding set 82 is defined as a second system. Hereinafter, configurations and the like concerning the first system are referred by adding "first", and configurations and the like concerning the second system are referred by adding "second". An index "1" is added to parameters and the like concerning the first system, and an index "2" is added to parameters and the like concerning the second system.

The first inverter 11 is a three-phase inverter and has first switching elements 111 to 116. The switching elements 111 to 113 are connected to the high potential side, and the switching elements 114 to 116 are connected to the low potential side.

The connecting point between a pair of U-phase switching elements 111 and 114 is connected to a first U-phase coil 811. The connecting point between a pair of V-phase switching elements 112 and 115 is connected to a first V-phase coil 812. The connecting point between a pair of W-phase switching elements 113 and 116 is connected to a first W-phase coil 813.

The second inverter 12 is a three-phase inverter and has second switching elements 121 to 126. The switching elements 121 to 123 are connected to the high potential side, and the switching elements 124 to 126 are connected to the low potential side.

The connecting point between a pair of U-phase switching elements 121 and 124 is connected to a second U-phase coil 821. The connecting point between a pair of V-phase switching elements 122 and 125 is connected to a second V-phase coil 822. The connecting point between a pair of W-phase switching elements 123 and 126 is connected to a second W-phase coil 823.

In the present embodiment, the switching elements 111 to 116 and 121 to 126 are MOSFETs, and the first switching elements 111 to 116 and the second switching elements 121 to 126 have different on-resistances. In the present embodiment, on-resistance R1 of the first switching elements 111 to 116 is lower than on-resistance R2 of the second switching elements 121 to 126, that is, R1<R2. Hence, when current is applied to the switching elements 111 to 116 and 121 to 126 in a similar manner, temperatures of the second switching elements 121 to 126 increase faster than those of the first switching elements 111 to 116.

A high potential line Lp1 connecting the high potential sides of the switching elements 111 to 113 is connected to a positive electrode of the battery 5. The high potential line Lp1 is provided with a power supply relay 71. A high potential line Lp2 connecting the high potential sides of the switching elements 121 to 123 is connected to the positive electrode of the battery 5. The high potential line Lp2 is provided with a power supply relay 72. The power supply relays 71 and 72 may be mechanical relays or MOSFETs as in the case of the switching element 111 and the like. It is noted that when MOSFETs are used as the power supply relays 71 and 72, it is desirable to provide a reverse connection protection relay connected so that a parasitic diode is directed in an opposite direction to prevent a current from flowing in an opposite direction when the battery 5 is oppositely connected erroneously.

A capacitor 73 is connected in parallel with the inverters 11 and 12.

A first current detection section 13 has current detection elements 131 to 133. The current detection element 131 is provided between the switching element 114 and a ground line Lg1 and detects a first U-phase current Iu1 flowing to the first U-phase coil 811. The current detection element 132 is provided between the switching element 115 and the ground line Lg1 and detects a first V-phase current Iv1 flowing to the first U-phase coil 812. The current detection element 133 is provided between the switching element 116 and the ground line Lg1 and detects a first W-phase current Iw1 flowing to the first W-phase coil 813.

A second current detection section 14 has current detection elements 141 to 143. The current detection element 141 is provided between the switching element 124 and a ground line Lg2 and detects a second U-phase current Iu2 flowing to the second U-phase coil 812. The current detection element 142 is provided between the switching element 125 and the ground line Lg2 and detects a second V-phase current Iv2 flowing to the second V-phase coil 822. The current detection element 143 is provided between the switching element 126 and the ground line Lg2 and detects a second W-phase current Iw2 flowing to the second W-phase coil 823.

In the present embodiment, the current detection elements 131 to 133 and 141 to 143 are shunt resistors, but may be Hall elements or the like. Detection values of the current detection sections 13 and 14 are output to the control section 30.

The thermistor 16 detects a base temperature Hb of transient temperature rise in the switching elements 111 to 116 and 121 to 126. In the present embodiment, a temperature of a heatsink 15 is defined as the base temperature Hb. A base temperature detection value Hb_sns, which is a detection value of the thermistor 16, is output to the control section 30.

Figure 3:
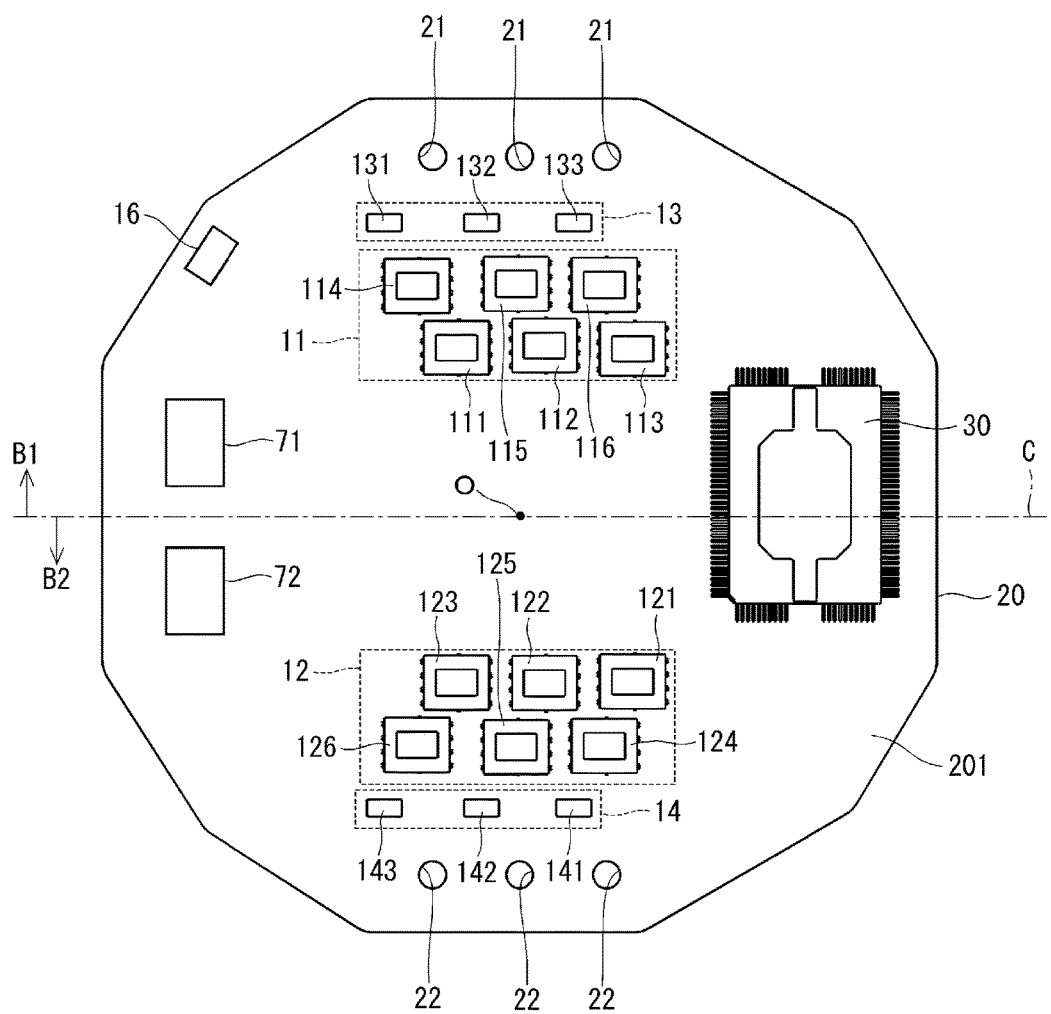
FIG. 3 is a plan view showing an arrangement of inverters and a thermistor according to the embodiment.

As shown in FIG. 3, the switching elements 111 to 116 and 121 to 126, the current detection elements 131 to 133 and 141 to 143, the thermistor 16, the control section 30, the power supply relays 71, 72 and the like are mounted on a surface 201 (see FIG. 1) of the substrate 20 at the heatsink 15 side. The switching elements 111 to 116 and 121 to 126 and the like are provided so as to release heat to the heatsink 15.

In FIG. 1, although the heatsink 15 is provided to the motor control apparatus 10, for example, a frame member provided to the motor control apparatus 10 side of the motor 80 may be used as a heatsink.

In the substrate 20, motor wire insertion holes 21 are formed through which respective motor wires (not shown) connected to the coils 811 to 813 are inserted. In addition, in the substrate 20, motor wire insertion holes 22 are formed through which respective motor wires (not shown) connected to the coils 821 to 823 are inserted. The substrate 20 and the motor wires are electrically connected by, for example, soldering.

The substrate 20 is divided into two areas by a center line C passing through the center O of the substrate 2. The area, in which the first switching elements 111 to 116, the current detection elements 131 to 133, and the power supply relay 71 are mounted, and the motor wire insertion holes 21 are formed, is defined as a first area B1. The area, in which the second switching elements 121 to 126, the current detection elements 141 to 143, and the power supply relay 72 are mounted, and the motor wire insertion holes 22 are formed, is defined as a second area B2. That is, components concerning the first system are provided to the first area B1, and components concerning the second system are provided to the second area B2.

The thermistor 16 of the present embodiment is mounted on the surface 201 of the substrate 20 at the heatsink 15 side and in the first area B1. The thermistor 16 is not necessarily disposed at the shown position, but may be disposed on any position in the first area B1 where the temperature of the heatsink 15 can be detected. In addition, it is desirable to dispose the thermistor 16 in the first area B1 and at a position apart from the switching elements 111 to 116, the current detection elements 131 to 133, the power supply relay 71, and motor wires, to which high currents are applied, as possible.

Figure 4:
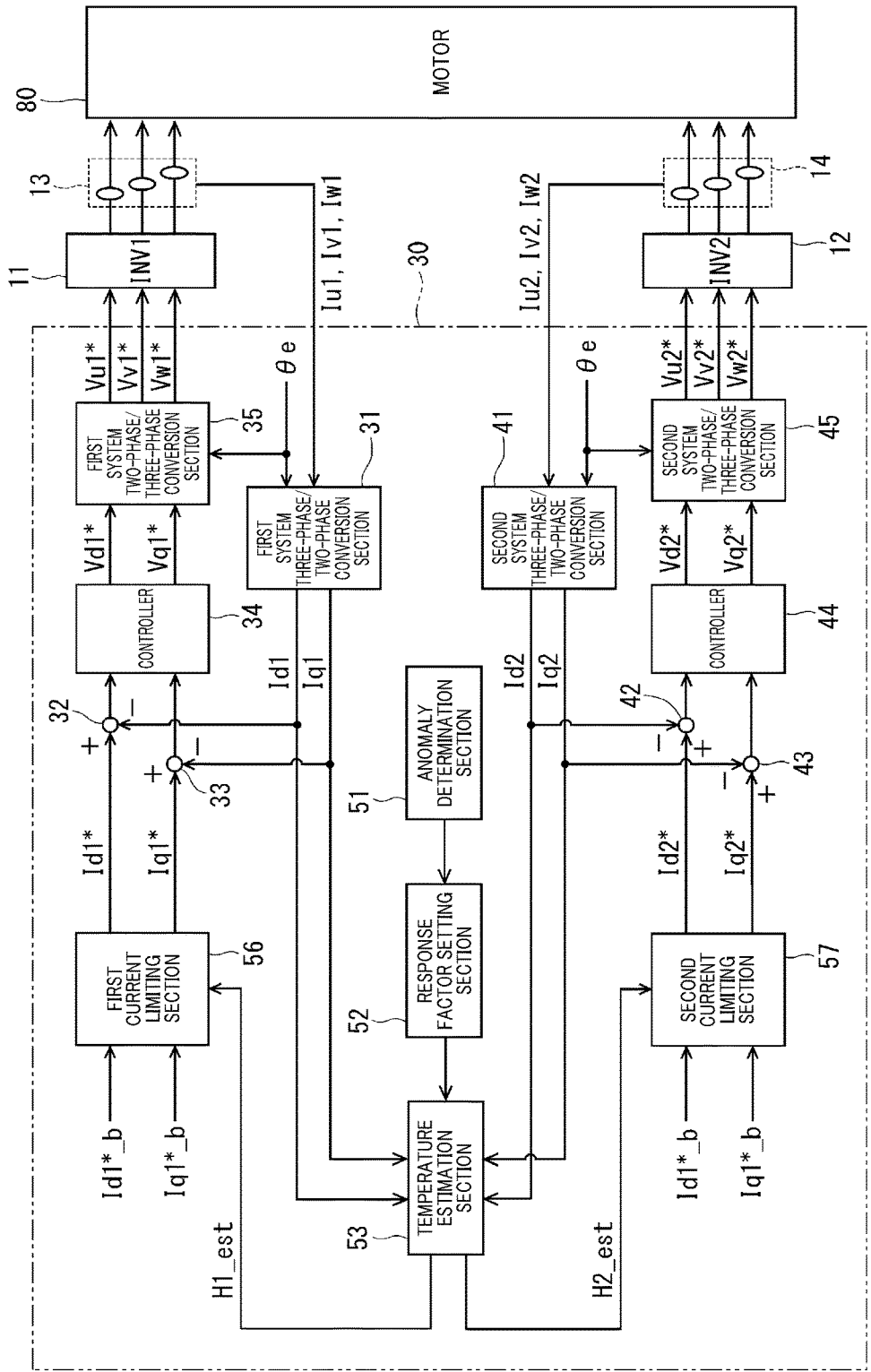
FIG. 4 is a block diagram illustrating a control section according to the embodiment.

As shown in FIGS. 2 to 4, the control section 30 is mainly configured by a microcomputer and the like. Each process of the control section 30 may be software processing performed by executing a program previously stored in an entity memory device, such as a ROM, by a CPU, or hardware processing performed by a dedicated electronic circuit.

The control section 30 controls drive of the motor 80 by current feedback control based on steering torque Ts obtained from the torque sensor 94, an electrical angle θe obtained from a rotation angle sensor 75, phase currents Iu1, Iv1, Iw1, Iu2, Iv2, and Iw2 obtained from the current detection sections 13 and 14, and the like.

As shown in FIG. 4, the control section 30 has three-phase two-phase conversion sections 31 and 41, subtracters 32, 33, 42, and 43, controllers 34 and 44, two-phase three-phase conversion sections 35 and 45, an anomaly determination section 51, a response factor setting section 52, which is a parameter setting section, a temperature estimation section 53, and current limiting sections 56 and 57.

The first system three-phase two-phase conversion section 31 performs dq conversion for the phase currents Iu1, Iv1, and Iw1 based on the electrical angle θe to calculate a first d axis current detection value Id1 and a first q axis current detection value Iq1.

The subtracter 32 calculates a deviation (difference) ΔId1 between a first d axis current command value Id1* and a first d axis current detection value Id1. The subtracter 33 calculates a deviation ΔIq1 between a first q axis current command value Iq1* and a first q axis current detection value Iq1.

The controller 34 calculates a first d axis voltage command value Vd1* and a first q axis voltage command value Vq1* by PI calculation or the like so that the deviations ΔId1 and ΔIq1 converge to 0.

The first system two-phase three-phase conversion section 35 performs inverse dq conversion for the first d axis voltage command value Vd1* and the first q axis voltage command value Vq1* based on the electrical angle θe to calculate three-phase first voltage command values Vu1*, Vv1*, and Vw1*.

The second system three-phase two-phase conversion section 41 performs dq conversion for the phase currents Iu2, Iv2, and Iw2 based on the electrical angle θe to calculate a second d axis current detection value Id2 and a second q axis current detection value Iq2.

The subtracter 42 calculates a deviation (difference) ΔId2 between a second d axis current command value Id2* and a second d axis current detection value Id2. The subtracter 43 calculates a deviation ΔIq2 between a second q axis current command value Iq2* and a second q axis current detection value Iq2.

The controller 44 calculates a second d axis voltage command value Vd2* and a second q axis voltage command value Vq2* by PI calculation or the like so that the deviations ΔId2 and ΔIq2 converge to 0.

The second system two-phase three-phase conversion section 45 performs inverse dq conversion for the second d axis voltage command value Vd2* and the second q axis voltage command value Vq2* based on the electrical angle θe to calculate three-phase second voltage command values Vu2*, Vv2*, and Vw2*.

The control section 30 generates a control signal concerning drive of the first inverter 11 based on the first voltage command values Vu1*, Vv1*, and Vw1* to control on-off operation of the switching elements 111 to 116 through a drive circuit 28 (see FIG. 2). In addition, the control section 30 generates a control signal concerning drive of the second inverter 12 based on the second voltage command values Vu2*, Vv2*, and Vw2* to control on-off operation of the switching elements 121 to 126 through the drive circuit 28.

Figure 5:
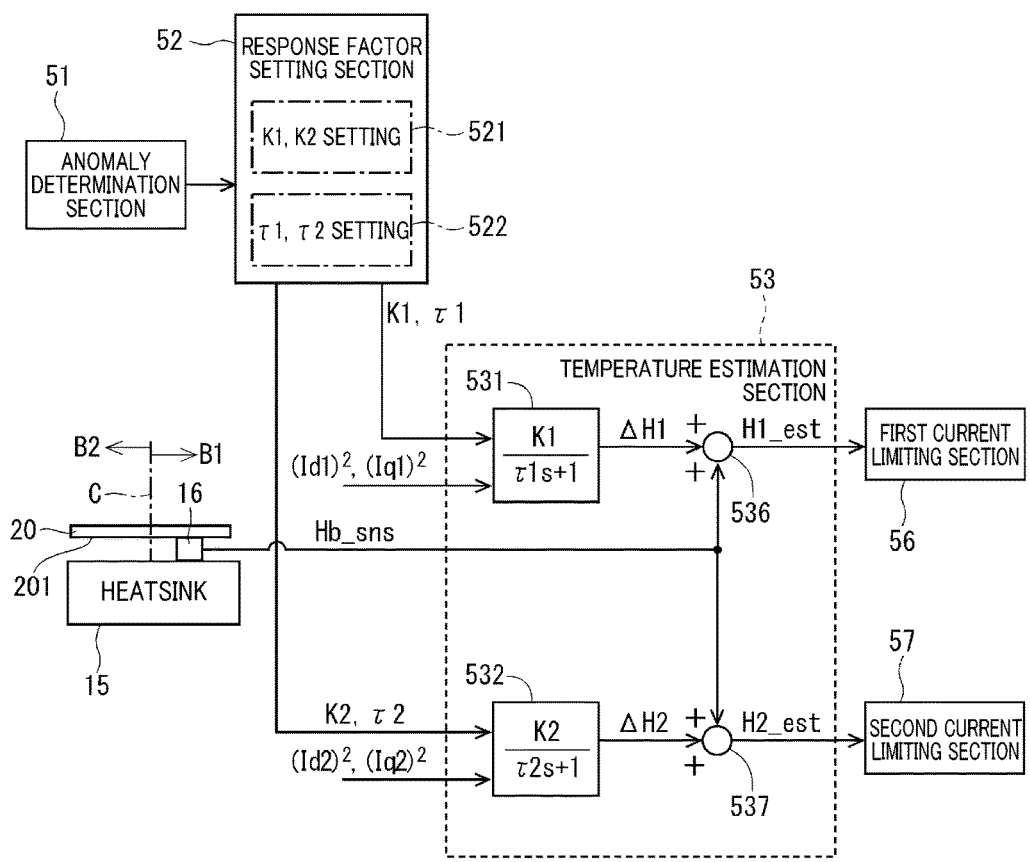
FIG. 5 is a block diagram illustrating a temperature estimation section according to the embodiment.

As shown in FIG. 4 and FIG. 5, the anomaly determination section 51 determines whether or not an anomaly has occurred in the first system or the second system. For example, a power supply fault, an earth fault, a disconnection, and a short-circuit fault and an open fault of a switching element are determined. The anomaly determination is performed by a known method. If both the first system and the second system are in normal states, the motor 80 is driven by using the first system and the second system. If an anomaly has occurred in the first system, the first system is stopped to use the second system to allow the motor 80 to be continuously driven. If an anomaly has occurred in the second system, the second system is stopped so that the first system can be used to allow the motor 80 to be continuously driven. If anomalies have occurred in both the first system and the second system, the drive of the motor 80 is stopped. Hereinafter, driving the motor 80 by using the first system and the second system is referred to as dual system drive, and driving the motor 80 by using the first system or the second system is referred to as single system drive.

As shown in FIG. 5, the response factor setting section 52 has a gain setting section 521 and a time constant setting section 522.

The gain setting section 521 sets a gain Kn used for temperature estimation.

The time constant setting section 522 sets a time constant τn used for temperature estimation.

Hereinafter, an index indicating a system is substituted into "n" of the gain Kn. The gain concerning temperature estimation of the first system is defined as a first gain K1, and the gain concerning temperature estimation of the second system is defined as a second gain K2. In addition, an index indicating a system is substituted into "n" of the time constant τn. The time constant concerning temperature estimation of the first system is defined as a first time constant τ1, and the time constant concerning temperature estimation of the second system is defined as a second time constant τ2.

In the present embodiment, the gain Kn and the time constant τn are defined as response factors (response constants), and changing at least one of the gain and the time constant corresponds to changing a response factor.

The temperature estimation section 53 estimates a first inverter temperature H1 and a second inverter temperature H2, which are temperatures of the respective systems.

Specifically, the temperature estimation section 53 has first-order lag calculators 531 and 532 and adders 536 and 537, and calculates a first temperature estimation value H1_est and a second temperature estimation value H2_est. In the present embodiment, the first temperature estimation value H1_est is a temperature estimation value of the first inverter 11, and the second temperature estimation value H2_est is a temperature estimation value of the second inverter 12.

The first-order lag calculator 531 receives current square values $(Id1)^2$ and $(Iq1)^2$, the gain K1, and the first time constant τ1 and calculates a first-order lag response by a transfer function $\{K1/(\tau1 s+1)\}$ for a time average of the received current square values or an integrated value of the current square values to output a temperature change amount ΔH1. The first-order lag calculator 531 may receive $(Id1)^2$ and $(Iq1)^2$ as current square values, or may receive the sum of the current square values (i.e. $(Id1)^2+(Iq1)^2$).

The first-order lag calculator 532 receives current square values $(Id2)^2$ and $(Iq2)^2$, the gain K2, and the time constant τ2 and calculates a first-order lag response by a transfer function $\{K2/(\tau2 s+1)\}$ for a time average of the received current square values or an integrated value of the current square values to output a temperature change amount ΔH2. The first-order lag calculator 532 may receive $(Id2)^2$ and $(Iq2)^2$ as current square values, or may receive the sum of the current square values (i.e. $(Id2)^2+(Iq2)^2$).

The adder 536 adds the base temperature detection value Hb_sns and the temperature change amount ΔH1 to calculate the first temperature estimation value H1_est. The first temperature estimation value H1_est is output to the first current limiting section 56.

The adder 537 adds the base temperature detection value Hb_sns and the temperature change amount ΔH2 to calculate the second temperature estimation value H2_est. The second temperature estimation value H2_est is output to the second current limiting section 57.

That is, the temperature estimation values H1_est and H2_est are expressed by the following expressions (1) and (2).

$$H1\_est = Hb\_sns + \Delta H1 \quad (1)$$

$$H2\_est = Hb\_sns + \Delta H2 \quad (2)$$

The first current limiting section 56 determines a first q axis current limiting value Iq1_lim based on the first temperature estimation value H1_est. The current limiting value Iq1_lim is determined so as to be smaller, as the temperature estimation value H1_est is larger, that is, as the first inverter temperature H1 is higher. If a first pre-limitation q axis current command value Iq1*_b determined based on a torque command value or the like is larger than the first q axis current limiting value Iq1_lim, the first current limiting section 56 uses the first q axis current command value Iq1* as the first q axis current limiting value Iq1_lim. If the first pre-limitation q axis current command value Iq1*_b is not larger than the first q axis current limiting value Iq1_lim, the first current limiting section 56 uses the first pre-limitation q axis current command value Iq1*_b as the first q axis current command Iq1* without change.

The second current limiting section 57 determines a second q axis current limiting value Iq2_lim based on the second temperature estimation value H2_est. The current limiting value Iq2_lim is determined so as to be smaller, as the temperature estimation value H2_est is larger, that is, as the second inverter temperature H2 is higher. If a second pre-limitation q axis current command value Iq2*_b determined based on a torque command value or the like is larger than the second q axis current limiting value Iq2_lim, the second current limiting section 57 uses the second q axis current command value Iq2* as the second q axis current limiting value Iq2_lim. If the second pre-limitation q axis current command value Iq2*_b is not larger than the second q axis current limiting value Iq2_lim, the second current limiting section 57 uses the second pre-limitation q axis current command value Iq2*_b as the second q axis current command value Iq2* without change.

Although the q axis current command values Iq1* and Iq2* are described here, values concerning the d axis current are used instead of values concerning the q axis current to similarly calculate the d axis current command value Id1* and Id2*.

Hereinafter, the base temperature detection value Hb_sns, which is a detection value of the thermistor 16, will be described.

Figure 6A:
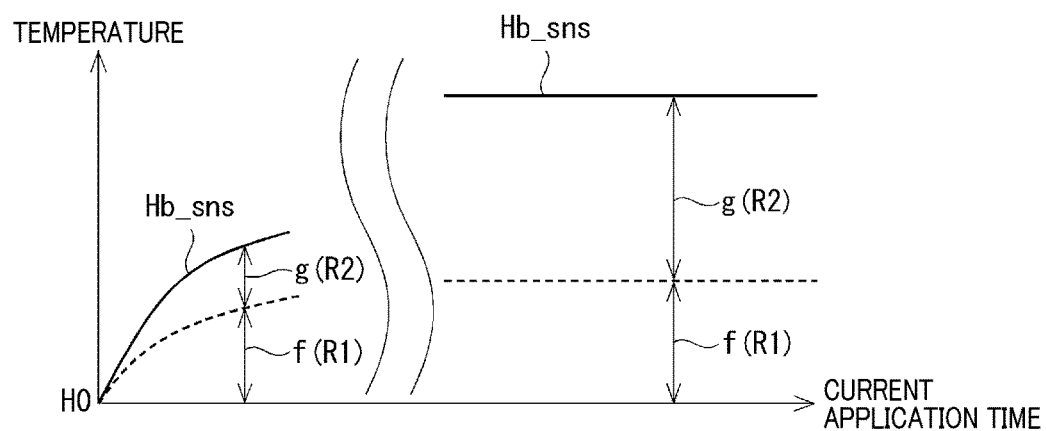
FIGS. 6A and 6B are timing diagrams illustrating details of an increase of base temperature according to the embodiment.
Figure 6B:
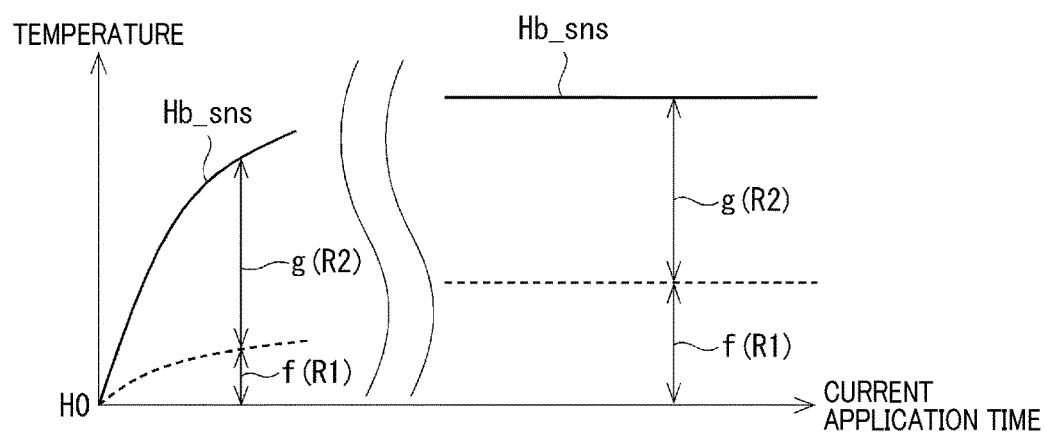
Figure 7A:
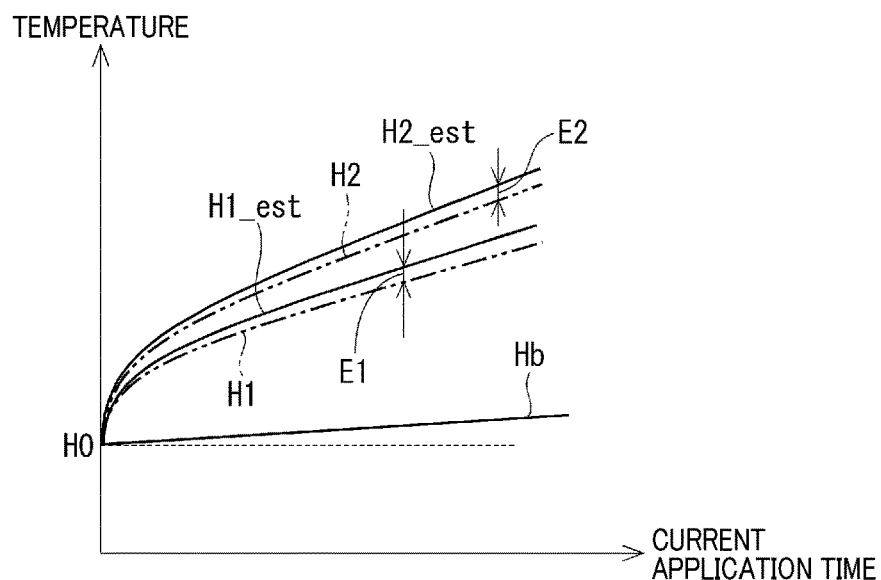
FIGS. 7A and 7B are timing diagrams illustrating a temperature estimation value according to the embodiment.
Figure 7B:
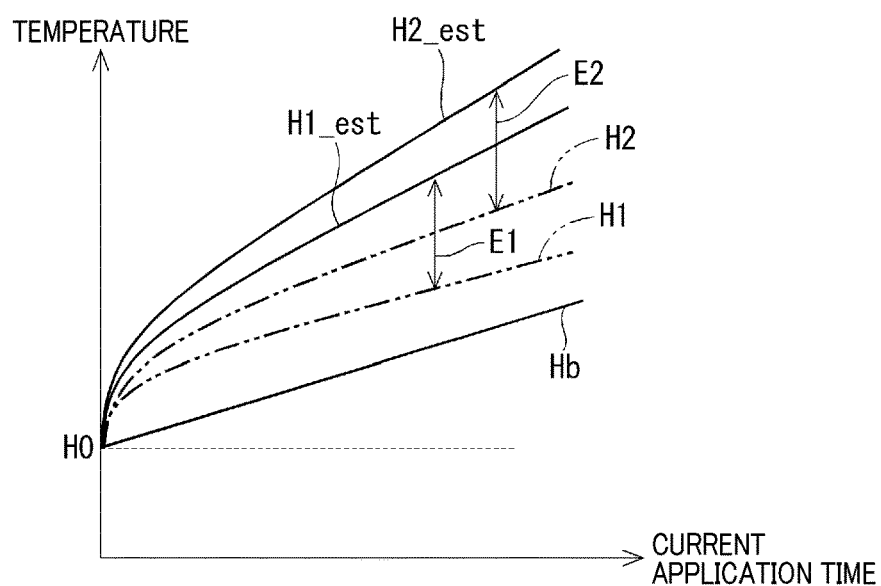

FIG. 6 illustrates details of an increase of the base temperature detection value Hb_sns brained when similar sinusoidal currents are applied to the winding sets 81 and 82. In FIG. 6, the horizontal axis indicates an initial temperature H0 of the heatsink 15, and factors other than heat generation from the inverters 11 and 12 due to the application of current are ignored. FIG. 6A illustrates a case where the thermistor 16 is disposed in the first area B1, and FIG. 6B illustrates a reference example of a case where the thermistor 16 is disposed in the second area B2.

The present embodiment and the reference example will be described. Hereinafter, a distance L1 is defined as a distance between the thermistor 16 and one of the switching elements 111 to 116 of the first inverter 11, which is closest to the thermistor 16 among them. A distance L2 is defined as a distance between the thermistor 16 and one of the switching elements 121 to 126 of the second inverter 12, which is closest to the thermistor 16 among them. In addition, the distances L1 and L2 may respectively be distances between the thermistor 16 and the centers of the areas in which the inverters 11 and 12 are mounted.

In the present embodiment, since the thermistor 16 is disposed in the first area B1, the distance L1 between the thermistor 16 and the first inverter 11 is smaller than the distance L2 between the thermistor 16 and the second inverter 12, that is, L1<L2.

In contrast, in the reference example, the distance L1 between the thermistor 16 and the first inverter 11 is larger than the distance L2 between the thermistor 16 and the second inverter 12, that is, L1>L2.

The base temperature detection value Hb_sns is expressed by the following expression (3).

$$Hb\_sns = f(R1) + g(R2) + H0 \quad (3)$$

In the expression, f(R1) is the temperature change amount due to heat receiving from the first inverter 11, g(R2) is the temperature change amount due to heat receiving from the second inverter 12, and H0 is an initial temperature of the heatsink 15. Hereinafter, heat, which is generated by temperature rising of the inverters 11 and 12 due to current application and is received by the thermistor 16, is referred to as received heat.

In addition, f(R1) in the expression (3) indicates that it is a function based on the on-resistance R1 of the switching elements 111 to 116. As the distance L1 between the first inverter 11 and the thermistor 16 is shorter, f(R1) becomes a larger value. In addition, g(R2) indicates that it is a function based on the on-resistance R2 of the switching elements 121 to 126. As the distance L2 between the second inverter 12 and the thermistor 16 is shorter, g(R2) becomes a larger value.

During a transition period by the end of which temperature of the motor control apparatus 10 is saturated, f(R1) and g(R2) in the expression (3) change depending on the position of the thermistor 16. Thus, the base temperature detection value Hb_sns changes depending on the position of the thermistor 16. It is noted that after the time period, between the time when current application starts and the time when the temperature of the motor control apparatus 10 is saturated, has passed, the base temperature detection value Hb_sns becomes constant regardless of the position of the thermistor 16.

In the example of FIG. 6A, since the thermistor 16 is disposed in the first area B1, the thermistor 16 is easily influenced by heat generated from the first switching elements 111 to 116. In the example of FIG. 6B, since the thermistor 16 is disposed in the second area B2, the thermistor 16 is easily influenced by heat generated from the second switching elements 121 to 126. In addition, since R1<R2 is established, when the thermistor 16 is disposed in the second area B2, the rise of the base temperature detection value Hb_sns during the transition period is large compared with a case where the thermistor 16 is disposed in the first area B1.

In addition, the temperature estimation values H1_est and H2_est are respectively calculated by adding the temperature change amounts ΔH1 and ΔH2 to the base temperature detection value Hb_sns (see expressions (1) and (2)). Hence, if the base temperature detection value Hb_sns increases due to the received heat, the temperature estimation values H1_est and H2_est may be estimated to be higher than actual values.

In the present embodiment, as shown in FIGS. 6A, 6B and FIGS. 7A, 7B, since the thermistor 16 is disposed in the first area B1, the rise of the base temperature detection value Hb_sns due to received heat from the switching elements 111 to 116 and 121 to 126 is effectively suppressed compared with a case where the thermistor 16 is disposed in the second area B2.

Hence, when the thermistor 16 is disposed in the first area B1, an estimated error E1, which is a difference between the first temperature estimation value H1_est and the actual first inverter temperature H1, is smaller than that in a case where thermistor 16 is disposed in the second area B2. Similarly, when the thermistor 16 is disposed in the first area B1, an estimated error E2, which a difference between the second temperature estimation value H2_est and the actual second inverter temperature H2, is smaller than that in a case where the thermistor 16 is disposed in the second area B2. That is, since the thermistor 16 is disposed in the first area B1, the temperature estimation values H1_est and H2_est can be calculated with high accuracy compared with a case where the thermistor 16 is disposed in the second area B2.

Figure 8A:
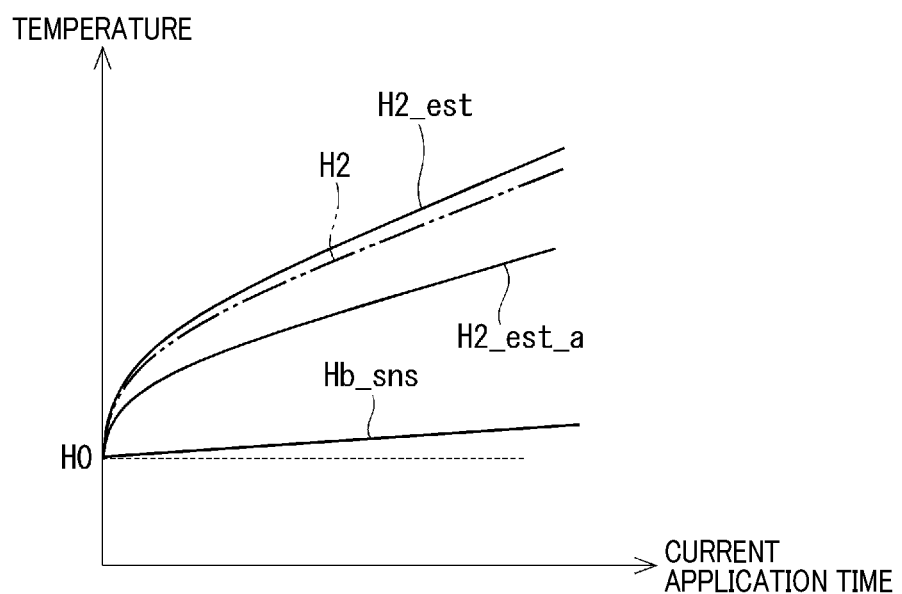
FIGS. 8A and 8B are timing diagrams illustrating a temperature estimation value when a single system is driven according to the embodiment.
Figure 8B:
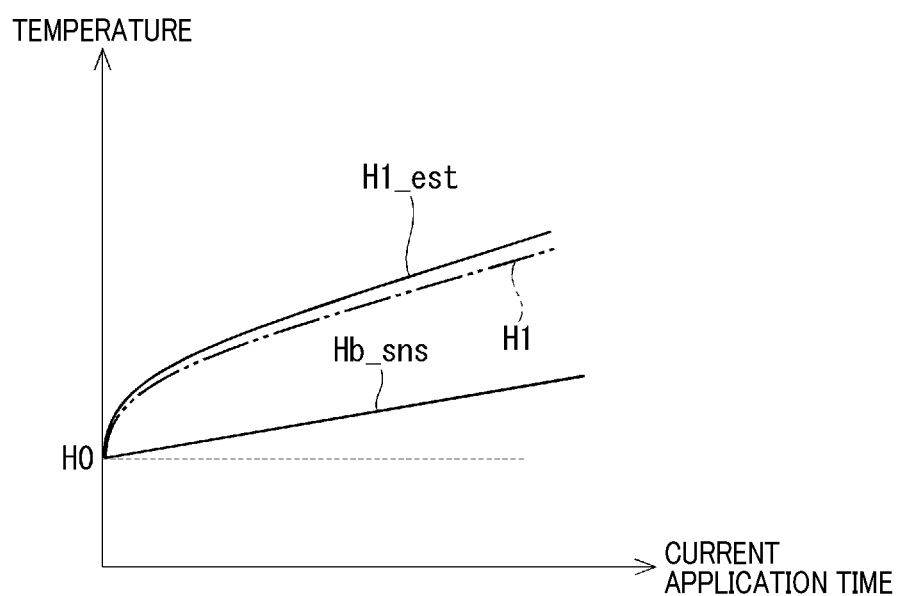

Temperature estimation when a single system is driven will be described with reference to FIG. 8A and FIG. 8B. FIG. 8A illustrates a case where an anomaly has occurred in the first system and a single system is driven in the second system. FIG. 8B illustrates a case where an anomaly has occurred in the second system and a single system is driven in the first system. In addition, in FIG. 8A, a temperature estimation value, which is obtained by calculating the temperature change amount ΔH2 by using the same gain and time constant as those used when dual systems are driven, is defined as H2_est_a. In addition, the inverter temperatures H1 and H2 of the system driven when a single system is driven are the same as those when dual systems are driven.

As shown in FIG. 8A, when a single system is driven using the second system, the first inverter 11 is not driven. Hence, the temperature does not increase due to the received heat from the first inverter 11, whereby the base temperature detection value Hb_sns becomes small compared with a case where dual systems are driven. Thus, when a single system is driven using the second system, if the temperature change amount ΔH2 is calculated by using the same gain and time constant as those used when dual systems are driven, the temperature estimation value H2_est_a becomes a value smaller than that in a case where dual systems are driven. Thereby, the difference from the actual temperature becomes large, resulting in decrease in estimation accuracy. To solve this, when a single system is driven using the second system, the response factor setting section 52 makes the gain K2 large and the time constant τ2 small compared with a case where dual systems are driven. Thereby, the temperature estimation value H2_est can be calculated with high accuracy.

As shown in FIG. 8B, when a single system is driven using the first system, the base temperature detection value Hb_sns becomes slightly small compared with a case where dual systems are driven, or becomes substantially the same as that in the case where dual systems are driven. Hence, when a single system is driven using the first system, even if the temperature change amount ΔH1 is calculated by using the same gain K1 and time constant τ1 as those used when dual systems are driven, the temperature estimation value H1_est can be calculated with relatively high accuracy.

It is noted that even when a single system is driven using the first system, the gain K1 and the time constant τ1 different from those used when dual systems are driven may be used. As described above, the difference between the base temperature detection value obtained when a single system is driven using the first system and the base temperature detection value obtained when dual systems are driven is smaller than the difference between the base temperature detection value obtained when a single system is driven using the second system and the base temperature detection value obtained when dual systems are driven. Hence, it is desirable that correction amounts of the gain K1 and the time constant τ1 are very small. In other words, the difference between the response factor used when dual systems are driven and the response factor used when a single system is driven using the second system is larger than the difference between the response factor used when dual systems are driven and the response factor used when a single system is driven using the first system.

As described above, the motor control apparatus 10 of the present embodiment controls drive of the motor 80 having a plurality of winding sets 81 and 82 and includes a plurality of inverters 11 and 12, the thermistor 16, and the control section 30.

The first inverter 11 is provided so as to correspond to the first winding set 81. The second inverter 12 is provided so as to correspond to the second winding set 82.

The thermistor 16 detects a base temperature Hb, which is used as a base for the estimation of the inverter temperatures H1 and H2, which are respectively temperatures of the inverters 11 and 12.

The control section 30 has the temperature estimation section 53. The temperature estimation section 53 estimates the inverter temperatures H1 and H2 based on the base temperature detection value Hb_sns, which is a detection value of the base temperature Hb, and the temperature change amounts ΔH1 and H2 generated by current application to the inverters 11 and 12. Specifically, the temperature estimation section 53 calculates the first temperature estimation value H1_est, which is a temperature estimation value of the first inverter 11, based on the base temperature detection value Hb_sns and the temperature change amount H1. In addition, the temperature estimation section 53 calculates the second temperature estimation value H2_est, which is a temperature estimation value of the second inverter 12, based on the base temperature detection value Hb_sns and the temperature change amount ΔH2.

In the present embodiment, on-resistances of the switching elements 111 to 116 of the first inverter 11, which is one of the plurality of inverters, is smaller than on-resistances of the switching elements 121 to 126 of the second inverter 12, which is another inverter.

In addition, the thermistor 16 is disposed in the first area B1, the distance between the first area B1 and the first inverter 11 being shorter than the distance between the first area B1 and the second inverter 12.

In the present embodiment, the thermistor 16 is disposed in the first area B1 positioned the first inverter 11 side, the first inverter 11 being configured by elements whose on-resistance is small. Hence, compared with a case where thermistor 16 is disposed in the second area B2 positioned at the second inverter 12 side, the second inverter 12 being configured by elements whose on-resistance is large, the thermistor 16 is not easily affected by received heat from the inverter. Thus, since the base temperature Hb can be properly detected, the inverter temperatures H1 and H2 can be properly estimated.

In addition, the combination of the winding sets 81 and 82 and the components provided so as to correspond to the winding sets 81 and 82 is defined as a system. That is, the combination of the winding set 81 and the components provided so as to correspond to the first winding set 81, such as the first inverter 11, is defined to as a first system. The combination of the second winding set 82 and the second inverter 12 provided so as to correspond to the winding set 82 is defined to as a second system.

When an anomaly has occurred in one of the systems, the control section 30 continues drive of the motor 80 by using the system in which an anomaly has not occurred.

When drive of the motor 80 is continued by using one of the systems, the temperature estimation section 53 changes parameters used for estimating an inverter temperature from those used when the rotary electrical machine is driven by using all the systems. Thus, an inverter temperature can be estimated with high accuracy even when a single system is driven.

The response factor used when an anomaly has occurred in the first system and drive of the motor 80 is continued in the second system has a larger correction amount with respect to the response factor used when the motor 80 is driven by using the first system and the second system than a correction amount with respect to the response factor used when an anomaly has occurred in the second system and drive of the motor 80 is continued in the first system. In the present embodiment, the thermistor 16 is disposed at the first inverter 11 side. Hence, when the motor 80 is driven without using the first system, the base temperature Hb is detected as a low value compared with a case where the motor 80 is driven by using the first system. To solve this, the correction amount of a parameter is made large when a single system is driven using the second system. Thereby, even when a single system is driven using any of the systems, inverter temperatures H1 and H2 can be estimated with high accuracy.

The temperature estimation section 53 has first-order lag calculators 531 and 532 that receive current square values concerning currents applied to the winding sets 81 and 82 or a time average of an integrated value of the current square values and outputs first-order lag responses as the temperature change amounts ΔH1 and ΔH2. The parameters used for estimating the inverter temperatures H1 and H2 are the gains Kn and the time constants τn of the first-order lag calculators 531 and 532.

Thus, the temperature estimation values H1_est and H2_est can be properly calculated.

The plurality of inverters 11, 12, the thermistor 16, and the control section 30 are disposed in a projection area obtained by projecting the motor 80 in the axial direction. The driving apparatus of present embodiment is a so-called mechanically and electrically integrated type, that is, the motor 80 and the motor control apparatus 10 are integrated. Hence, components concerning the motor control apparatus 10 are disposed in a relatively small space. The thermistor 16 is easily affected by received heat from the inverters 11 and 12. According to the present embodiment, since the thermistor 16 is disposed at the first inverter 11 side, the first inverter 11 being configured by elements having small on-resistance, even when the components concerning the motor control apparatus 10 are arranged in a relatively small space, the influence of the received heat due to current application can be suppressed.

The electric power steering apparatus 8 includes the motor control apparatus 10, the motor 80, and the reducing gear 89. The motor 80 generates auxiliary torque assisting steering operation of the driver. The reducing gear 89 transmits rotation of the motor 80 to the steering shaft 92.

In the electric power steering apparatus 8, since there are many current application patterns by which a large current is applied in a short period of time, for example, lock current application, temperatures of the inverters 11 and 12 often increase in a short period of time. Thereby, the thermistor 16 is easily affected by received heat due to current application. According to the present embodiment, even when the thermistor 16 is disposed at the first inverter 11 side, the first inverter 11 being configured by elements having small on-resistance, to apply the motor control apparatus 10 to the electric power steering apparatus 8, the influence of the received heat due to current application can be suppressed.

Other Embodiments (a) Temperature Estimation Section

In the above embodiment, when a single system is driven, the gain and the time constant of the first-order lag calculators, which calculate a temperature change amount, are changed. In another embodiment, when a single system is driven, one of the gain and the time constant may be changed. In addition, when a single system is driven, the parameter other than the response factor of the first-order lag calculator used for estimating an inverter temperature may be changed.

In the above embodiment, the temperature estimation section calculates a temperature estimation value for each of the inverters. In another embodiment, the temperature estimation section estimates an element temperature, which is a temperature of a switching element, and may use the element temperature or a value calculated based on the element temperature (e.g. maximum value or average value) as an inverter temperature.

(b) Inverter

In the above embodiment, a plurality of inverters are provided on the same surface of the same substrate. In another embodiment, the first inverter may be provided on one surface of the substrate, and the second inverter may be provided on the other surface of the substrate. In this case, the temperature detection element is provided at the side where the first inverter is mounted. In addition, in another embodiment, the first inverter and the second inverter may be provided on different substrates. In this case, the temperature detection element is provided on a substrate on which the first inverter is mounted.

In the above embodiment, the inverter, the current detection elements, the temperature detection element, the power supply relay, and the control section are mounted on the same surface of the same substrate. In another embodiment, some of these components may be mounted on a different surface of the same substrate, or may be separately mounted on a plurality of substrates.

In the above embodiment, the rotary electrical machine control apparatus is provided with two inverters. In another embodiment, three or more inverters may be provided. In this case, each of the inverters may have individual on-resistance of the switching elements. In addition, if two or more types of elements having different on-resistances are used, on-resistances of the switching elements of some inverters may be the same. For example, if three inverters are used, on-resistances of the switching elements of two of the inverters are the same, and on-resistances of the switching elements of the remaining one inverter are different from those of the two inverters. If three or more inverters are used, the inverter configured by elements having the minimum on-resistance is assumed to be a first inverter, and the other inverters are assumed to be second inverters. In addition, if a plurality of inverters configured by elements having the minimum on-resistance are used, one of the inverters is assumed to be a first inverter, and the temperature detection element may be disposed in an area where the inverter is disposed.

In the above embodiment, the switching elements are MOSFETs. In another embodiment, the switching elements may be other than MOSFETs, such as IGBTs or thyristors. In addition, different types of devices may be used as the switching elements between the first inverter and the second inverter. For example, MOSFETs are used for one of the first inverter and the second inverter, and IGBTs are used for the other of the first inverter and the second inverter.

(c) Temperature Detection Element

In the above embodiment, the temperature detection element is provided in an area at the side of the substrate on which the first inverter is mounted. In another embodiment, the temperature detection element may not be mounted on the substrate. For example, the temperature detection element may be disposed on the heatsink to output a detection value to the control section through a signal line and the like.

In the above embodiment, the temperature detection element is a thermistor. In another embodiment, the temperature detection element is not limited to a thermistor if it can detect a base temperature. In addition, in the above embodiment, the temperature detection element detects a temperature of the heatsink as a base temperature. In another embodiment, the temperature detection element may detect a temperature of a portion other than the heatsink, such as a temperature of the substrate on which the inverter is mounted, as a base temperature.

(d) Rotary Electrical Machine and Rotary Electrical Machine Control Apparatus

In the above embodiment, drive of the rotary electrical machine is controlled by current feedback control for each system. In another embodiment, drive of the rotary electrical machine may be controlled by, instead of the current feedback control for each system, by feeding back the sum and the difference of currents of two systems. In addition, the method of controlling the rotary electrical machine is not limited to the current feedback control.

In the above embodiment, the rotary electrical machine has two winding sets. In another embodiment, the rotary electrical machine may have three or more winding sets. That is, three or more systems may be provided. In the above embodiment, the rotary electrical machine is a three-phase brushless motor. In another embodiment, the rotary electrical machine is not limited to a three-phase brushless motor, but may be a four or more-phase brushless motor. In addition, the rotary electrical machine is not limited to a brushless motor, but may be any type of motor. The rotary electrical machine is not limited to a motor, but may be a generator or a so-called motor generator having both functions of a motor and a generator.

In the above embodiment, the rotary electrical machine and the rotary electrical machine control apparatus are integrated so as to be a mechanically and electrically integrated type. In another embodiment, the rotary electrical machine and the rotary electrical machine control apparatus may be separately provided.

In the above embodiment, the rotary electrical machine is applied to an electric power steering apparatus. In another embodiment, the rotary electrical machine may be applied to an apparatus other than the electric power steering apparatus.

It will be appreciated that the present invention is not limited to the configurations described above, but any and all modifications, variations or equivalents, which may occur to those who are skilled in the art, should be considered to fall within the scope of the present invention.

Hereinafter, an aspect of the above-described embodiments will be summarized.

As an aspect of the embodiment, a rotary electrical machine control apparatus is provided which controls drive of a rotary electrical machine (80) having a plurality of winding sets (81, 82) and includes a plurality of inverters (11, 12), a temperature detection element (16), and a control section (30).

The inverters are provided so as to respectively correspond to the winding sets.

The temperature detection element detects a base element that is used as a base for estimation of inverter temperatures, which are temperatures of the inverters.

The control section has a temperature estimation section (53). The temperature estimation section estimates the inverter temperatures based on the base temperature and a temperature change amount generated due to current application to the inverters.

On-resistance of the switching elements (111 to 116) of the first inverter (11), which is one of the plurality of inverters, is smaller than on-resistance of the switching elements (121 to 126) of the second inverter (12), which is one of the plurality of inverters.

The temperature detection element is disposed in an area, a distance between the area and the first inverter being shorter than a distance between the area and the second inverter.

The temperature detection element is disposed at the first inverter side, the first inverter being configured by switching elements whose on-resistance is small. Hence, compared with a case where the temperature detection element is disposed at the second inverter side, the second inverter being configured by switching elements whose on-resistance is large, the temperature detection element is not easily affected by received heat from the inverter. Thus, since the base temperature can be properly detected, the inverter temperatures can be properly estimated.

What is claimed is:

1. A rotary electrical machine control apparatus that controls drive of a rotary electrical machine having a plurality of winding sets, the apparatus comprising:
    a plurality of inverters that are provided so as to respectively correspond to the winding sets;
    a temperature detection element that detects a base element that is used as a base for estimation of inverter temperatures, which are temperatures of the inverters; and
    a control section that has a temperature estimation section that estimates the inverter temperatures based on the base temperature and a temperature change amount generated due to current application to the inverters, wherein
    on-resistance of the switching elements of the first inverter, which is one of the plurality of inverters, is smaller than on-resistance of the switching elements of the second inverter, which is one of the plurality of inverters, and
    the temperature detection element is disposed in an area, a distance between the area and the first inverter being shorter than a distance between the area and the second inverter.

2. The rotary electrical machine control apparatus according to claim 1, wherein
    if combinations of the winding set and components including the inverter provided so as to correspond to the winding set are defined as systems,
    if an anomaly has occurred one of the system, the control section continues the drive of the rotary electrical machine by using the system in which an anomaly has not occurred.

3. The rotary electrical machine control apparatus according to claim 2, wherein
    the control section has a parameter setting section that sets a parameter used for calculation by the temperature estimation section, and
    when the drive of the rotary electrical machine is continued by using one of the systems, the parameter setting section sets a parameter different from that used when the rotary electrical machine is driven by using all of the systems.

4. The rotary electrical machine control apparatus according to claim 3, wherein
    the parameter used when an anomaly has occurred in a first system concerning the first inverter and drive of the rotary electrical machine is continued in a second system concerning the second inverter has a larger correction amount with respect to a parameter used when the rotary electrical machine is driven by using the first system and the second system than a correction amount with respect to a parameter used when an anomaly has occurred in the second system and drive of the rotary electrical machine is continued by using the first system.

5. The rotary electrical machine control apparatus according to claim 3, wherein
    the temperature estimation section has a first-order lag calculator that receives current square values concerning currents applied to the winding sets or a time average of an integrated value of the current square values and outputs a first-order lag responses as the temperature change amount, and
    the parameter is a response factor of the first-order lag calculator.

6. The rotary electrical machine control apparatus according to claim 1, wherein
    the plurality of inverters, the temperature detection element, and the control section are disposed in a projection area obtained by projecting the rotary electrical machine in an axial direction.

7. An electric power steering apparatus, comprising:
    the rotary electrical machine control apparatus according to claim 1;
    a rotary electrical machine that generates auxiliary torque for assisting steering operation of a drive; and
    a power transmission member that transmits rotation of the rotary electrical machine to an object to be driven.

* * * * *